(12) United States Patent  (10) Patent No.: US 9,257,819 B1
Hagen  (45) Date of Patent: Feb. 9, 2016

(54) ELECTRICAL FISHING SYSTEM FOR A DROP CEILING

(71) Applicant: Robert Hagen, Pawtucket, RI (US)

(72) Inventor: Robert Hagen, Pawtucket, RI (US)

( * ) Notice: Subject to any disclaimer, the term of this patent is extended or adjusted under 35 U.S.C. 154(b) by 194 days.

(21) Appl. No.: 13/913,923

(22) Filed: Jun. 10, 2013

Related U.S. Application Data

(60) Provisional application No. 61/658,097, filed on Jun. 11, 2012.

(51) Int. Cl.
*H02G 1/06* (2006.01)

(52) U.S. Cl.
CPC ........................................ *H02G 1/06* (2013.01)

(58) Field of Classification Search
CPC .......... H02G 1/08; H02G 1/085; H02G 1/236
See application file for complete search history.

(56) References Cited

U.S. PATENT DOCUMENTS

| | | | |
|---|---|---|---|
| 3,038,702 A | 6/1962 | Trunnell | |
| 3,295,832 A | 1/1967 | Fowler | |
| 5,083,372 A * | 1/1992 | Polutnik et al. | 29/890.043 |
| 5,129,636 A * | 7/1992 | Bridgstock | 269/43 |
| 6,857,628 B2 * | 2/2005 | Baker | 269/45 |
| 6,916,014 B1 | 7/2005 | Thomas | |
| 7,093,822 B2 | 8/2006 | Welker | |
| 7,304,239 B1 | 12/2007 | Harris et al. | |
| 7,967,343 B2 * | 6/2011 | Bortoli | 285/411 |
| 2014/0246824 A1 * | 9/2014 | Fiegener et al. | 269/265 |
| 2014/0367964 A1 * | 12/2014 | Kobayashi et al. | 285/412 |

* cited by examiner

*Primary Examiner* — Lee D Wilson
(74) *Attorney, Agent, or Firm* — Robert C. Montgomery; Montgomery Patent & Design LP.

(57) ABSTRACT

An electrical wire fishing system provides assistance in the pulling of cable through drop ceiling cavities. The system comprises a first component which is used at the entrance to the drop ceiling cavity and comprises a tube held in place by clamps. The first component utilizes a pair of spring-loaded cams which allow the cable to only travel in a single direction. Should the cable attempt to fall down, the cams will lock in place preventing such an action. A second component is used at the exit of the ceiling cavity and utilizes a pair of guideposts. These guideposts guide the cable out of the ceiling cavity and prevent it from becoming caught up on ceiling grid. With the system properly in place, cable can be pulled through a ceiling cavity by a single person.

8 Claims, 5 Drawing Sheets

ELECTRICAL FISHING SYSTEM FOR A DROP CEILING

RELATED APPLICATIONS

The present invention was first described in and claims the benefit of U.S. Provisional Application No. 61/658,097, filed Jun. 11, 2012, the entire disclosures of which are incorporated herein by reference.

FIELD OF THE INVENTION

The present invention relates generally to electrical wiring and, more particularly, to a system for providing assistance in the pulling of cables.

BACKGROUND OF THE INVENTION

A task common to the electrical field is pulling metal clad cables into drop ceiling cavities. During a typical installation, the wire spool containing the cable is located upon a floor while the end of the cable is connected to a fish tape which has been routed through the ceiling.

Should someone not be present at the opposite end of the fish tape, the weight of the cable will pull the fish tape through the ceiling cavity forcing the process to start all over again. Additionally, the corrugated nature of the cable is prone to becoming caught on the drop ceiling components as it enters and exits the ceiling cavity.

Having recognized the abovementioned problems, the inventor observed that there remains a need for an electrical cable fishing system for drop ceilings.

SUMMARY OF THE INVENTION

The principles of the present invention provide for a means to enable the fishing of cable through a drop ceiling in a single direction, and arresting motioning of said cable in a reverse direction.

In order to accomplish the aforementioned operation, a first component is installed adjacent an entrance to a drop ceiling and a second component is installed adjacent an exit of the drop ceiling.

In at least one (1) embodiment, each of the components comprise a generally cylindrical tubular body.

Both the first and second components are removably attached to structures in the drop ceiling by a pair of clamping features. In at least one (1) embodiment, each of the clamping features include a clamp shaft passing perpendicularly through the body adjacent to either end and having a clamp handle at one (1) distal end and a clamp plate with a clamp spring at an opposing distal end.

The first component comprises a pair of gate structures configured to enable the cable to pass through forwardly, and clamp on the cable when motioned rearwardly. In at least one (1) embodiment, the pair of gate structures comprises opposing mirror-image spring-loaded cam devices affixed to an upper surface of the body of the first component via a pivot bolt. A torsion spring encompasses an outer surface of the pivot bolt. Each torsion spring biases said first gate portion against said second gate portion. Further, the arcuate member has an outwardly facing textured surface configured to provide a frictional contact with the cable.

The second component has a pair of guidepost portions integral to and upwardly extending from the body thereof. In at least one (1) embodiment, the pair of guidepost portions are parallel cylindrical appendages intermediately positioned upon the body and spaced apart sufficiently so as to slidingly contain at least one (1) cable therebetween.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

Figure 1:
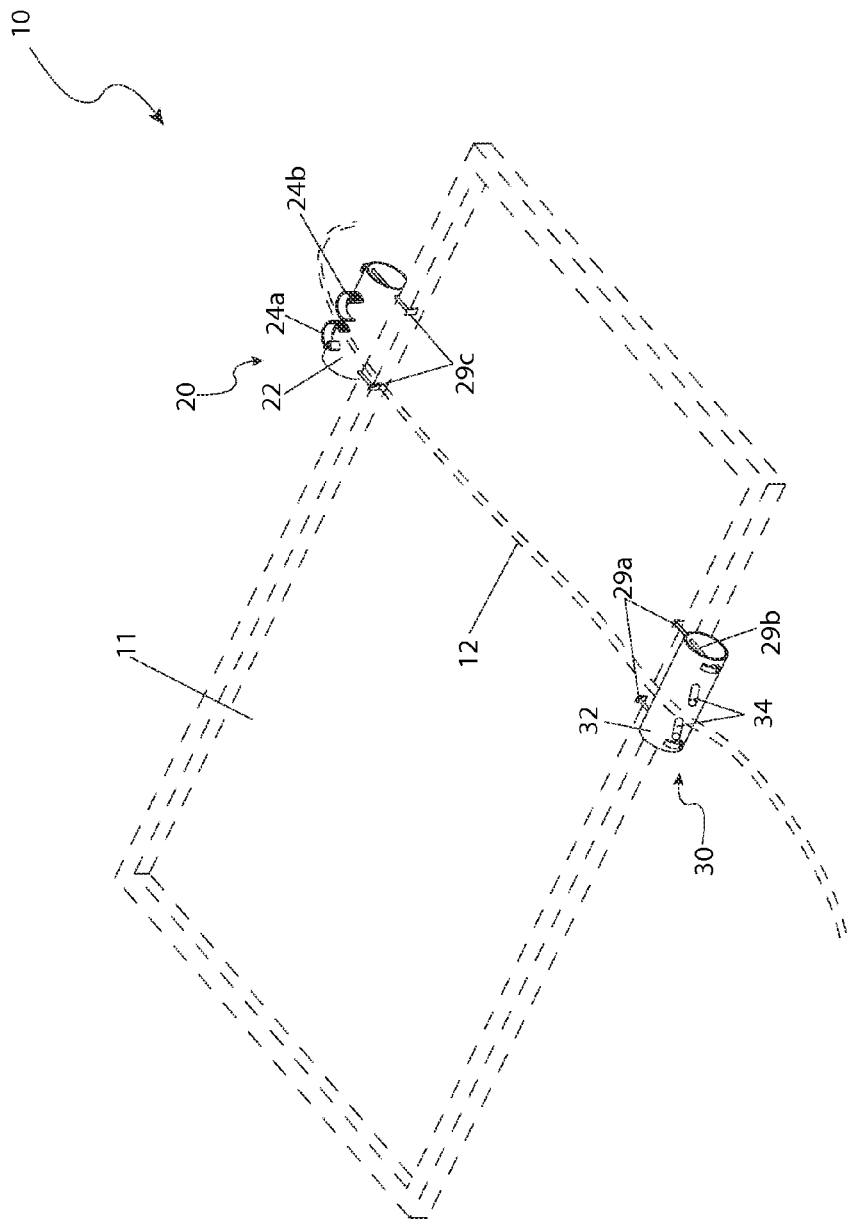
FIG. 1 is an environmental view of an electrical fishing system for a drop ceiling 10, according to a preferred embodiment of the present invention.

DESCRIPTIVE KEY 10 electrical fishing system for a drop ceiling
11 drop ceiling
12 cable
20 first component
22 first component tube
24a first gate assembly
24b second gate assembly
25a pivot bolt
25b pivot spring
26 textured surface
28 first component clamp
29a clamp plate
29b clamp shaft
29c clamp handle
29d clamp spring
29e clamp handle pivot pin
30 second component
32 second component tube
34 guidepost
36 second component clamp

DETAILED DESCRIPTION OF THE PREFERRED EMBODIMENT

The best mode for carrying out the invention is presented in terms of its preferred embodiment, herein depicted within FIGS. 1 through 4b. However, the invention is not limited to the described embodiment, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an electrical fishing system for a drop ceiling (herein described as the "system") 10, which provides a means for easily pulling, or "fishing", cable 12, such as metal clad (MC) cable, into drop ceiling 11 cavities.

Referring now to FIG. 1, an environmental view of the system 10, according to the preferred embodiment of the present invention, is disclosed. The system 10 comprises a first component 20 and a second component 30 to guide at least one (1) cable 12 above a drop-type ceiling 11. The components 20, 30 are utilized together to route and directionally secure the cable 12 from a starting side edge portion of the drop ceiling 11 to an opposing side edge portion of said drop ceiling 11. Said first 20 and second components 30 are clamped onto structural features such as "T"-rail portions or the like along opposing side edges using respective first component clamp 28 and second component clamp 36 portions (see FIGS. 2 and 3).

Figure 2:
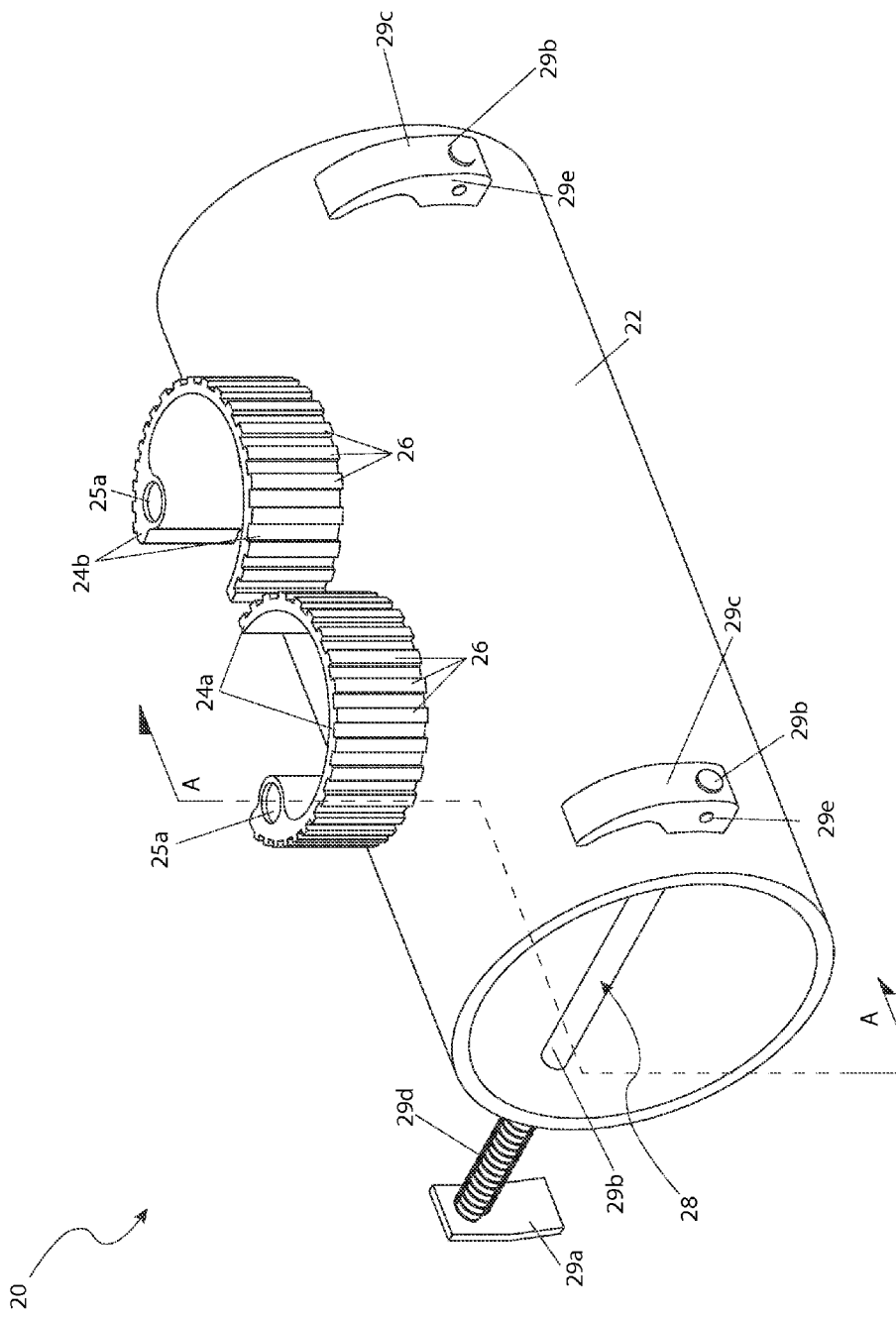
FIG. 2 is a perspective view of a first component 20, according to a preferred embodiment of the present invention.

Referring now to FIG. 2, a perspective view of the first component 20, according to the preferred embodiment of the present invention, is disclosed. The first component 20 is adapted to be utilized at the entrance to the drop ceiling 11 to clamp the cable 12 in a single-directional manner (see FIG. 1), and is comprised of a first component tube 22. The first component tube 22 is preferably fabricated from a durable cylindrical material such as plastic or PVC tubing and retains a first gate portion 24a and a second gate portion 24b along an upper surface. The first component tube 22 further comprises a pair of first component clamps 28 located at opposing ends along a lower surface portion. The gate portions 24a, 24b comprise opposing mirror-image spring-loaded cam devices which enable the cable 12 to move forwardly between the gates 24a, 24b, but not rearwardly, thereby eliminating said cable 12 from descending from the ceiling 11 unexpectedly (see FIGS. 4a and 4b).

Figure 3:
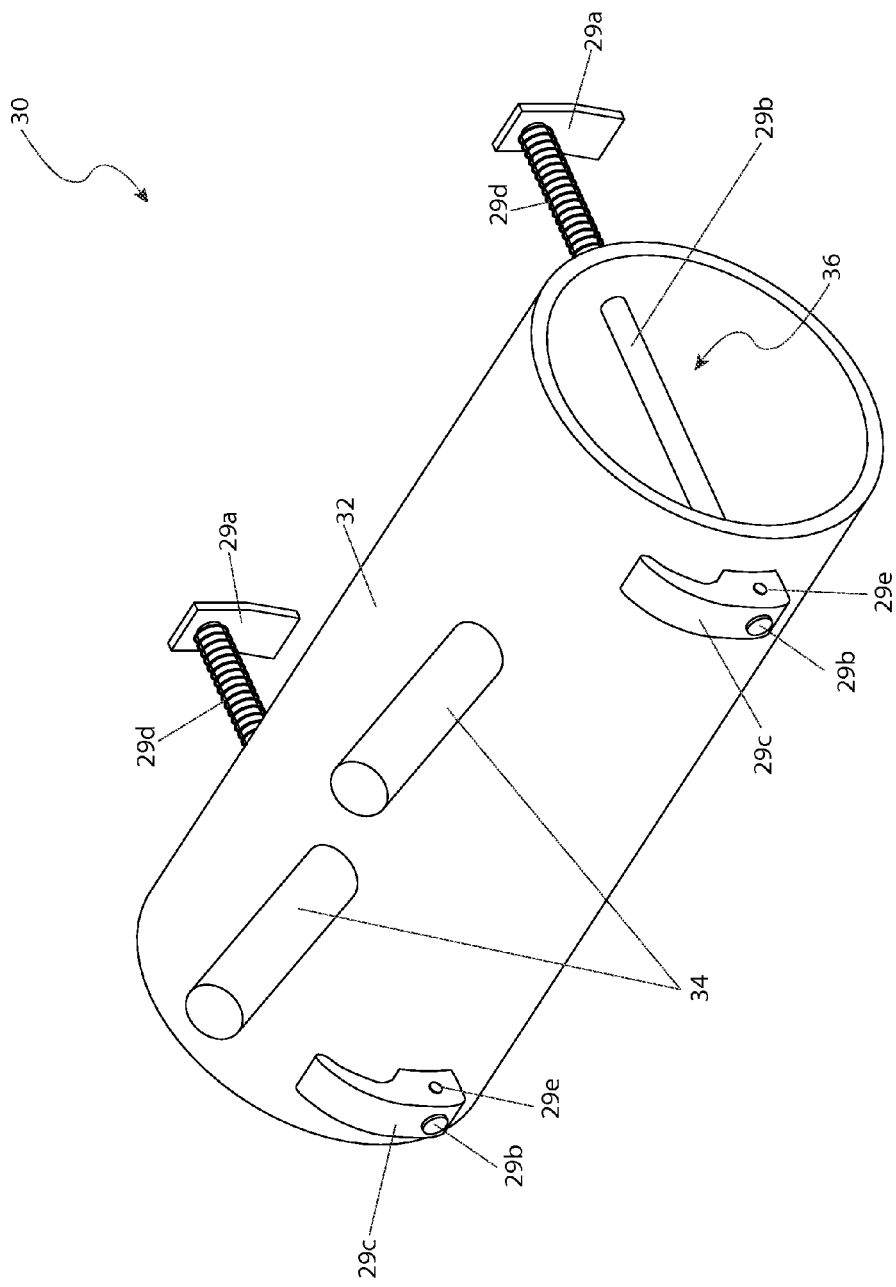
FIG. 3 is a perspective view of a second component 30, according to a preferred embodiment of the present invention.

Referring now to FIG. 3, a perspective view of the second component 30, according to the preferred embodiment of the present invention, is disclosed. The second component 30 is adapted to be utilized a location where the cable 12 exits the drop ceiling 11 (see FIG. 1), and is comprised of a second component tube 32 having features which guide the cable 12 to another side of the drop ceiling 11 opposite the first component 20. The second component tube 32 comprises similar shape and materials as the first component 20 and retains a pair of integral upwardly extending guidepost portions 34 and a pair of second component clamps 36 along a bottom surface.

The guideposts 34 comprise parallel cylindrical appendages intermediately positioned upon the second component tube 32 being spaced apart sufficiently so as to slidingly contain at least one (1) cable 12 therebetween, guiding said routed cable 12 above the drop ceiling 11. The guideposts 34 are integral to and extend upwardly from the second component tube 32. The second component tube 32 also comprises a pair of integral second component clamps 36, similar to the first component clamps 28, also located on opposing end portions. In like manner, the second component clamps 36 are utilized to attach the second component 30 to structural elements along an edge of the drop ceiling 11. An embodiment of the second component clamps 36 are illustrated here comprising spring-loaded clamp plates 29a; however, other equivalent clamping devices may be utilized in both the first 28 and second 36 component clamps with equal benefit without limiting the scope of the invention.

Figure 4A:
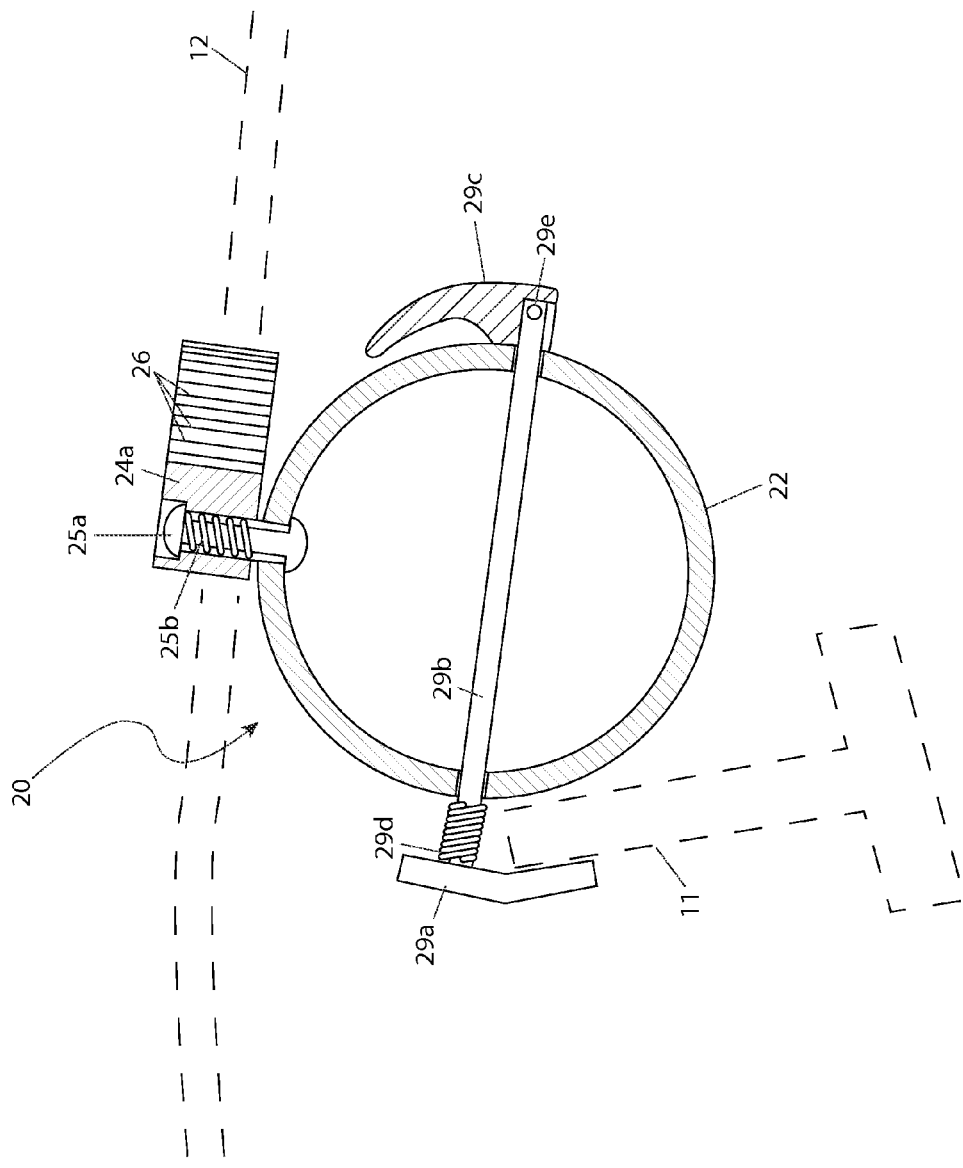
FIG. 4a is a sectional view of a first component portion 20 of the electrical fishing system for a drop ceiling 10 depicting a clamped state, taken along section line A-A (see FIG. 2), according to a preferred embodiment of the present invention; and, FIG. 4b is another sectional view of the first component portion 20 depicting a released state, also taken along section line A-A, according to a preferred embodiment of the present invention.
Figure 4B:
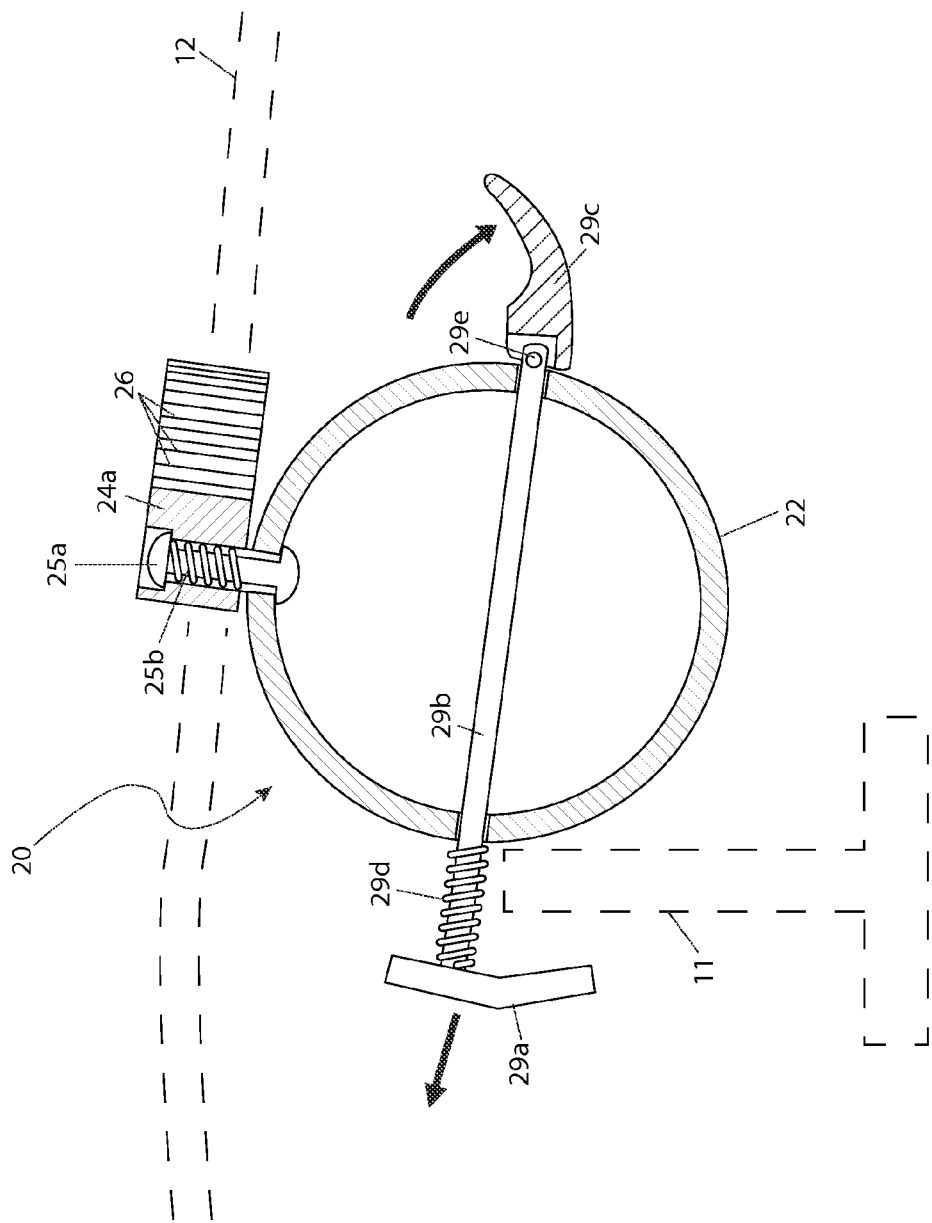

Referring now to FIGS. 4a and 4b, sectional views of the first component portion 20 of the system 10 depicting clamped and released states, taken along section line A-A (see FIG. 2), according to a preferred embodiment of the present invention, are disclosed. Each gate portion 24a, 24b comprises an arcuate member being affixed to a forward upper surface of the first component tube 22 via a respective pivot bolt 25a and further comprising a torsion-type pivot spring 25b therearound which acts to bias the first 24a and second 24b gate assemblies against each other in a spring-loaded manner. Each gate assembly 24a, 24b further comprises an outwardly facing textured surface 26 providing high-friction contact with the cable 12 contained between. The textured surfaces 26 are envisioned to comprise knurled or grooved machined patterns or may comprise an adhesively bonded plastic or rubber sheet material covering parallel adjacent surfaces. Said gate portions 24a, 24b comprise mirror-image forms providing vertically parallel and horizontally divergent curved surfaces which press upon the cable 12 so as to allow said cable 12 to move freely in a forward direction by opening the gates 24a, 24b, and conversely, causing the gates 24a, 24b to close upon the cable 12 when motioned rearwardly (also see FIG. 2).

The first component tube 22 also comprises a pair of first component clamps 28 having respective spring-loaded clamp plates 29a which provide a means to clamp the first component 20 onto structural element portions such as "T"-rail portions of the drop ceiling 11. Each first component clamp 28 is affixed to an opposing end portion of said first component tube 22 via respective clamp shaft portions 29b which slidingly pass perpendicularly through a center line of said first component tube 22. A clamp plate 29a is permanently affixed to one (1) end portion of the clamp shaft 29b in a perpendicular and downwardly extending direction to enable hooking upon a structural feature of the drop ceiling 11. A compression-type clamp spring 29d slidingly encompasses a portion of the clamp shaft 29b, being entrapped between the clamp plate 29a and the first component tube 22, thereby biasing said clamp plate 29a away from the first component tube 22. A clamp handle 29c is affixed to an opposing end portion of said clamp shaft 29b via a clamp handle pivot pin 29e. The clamp handle 29c comprises an arcuate appendage which may be rotated about the clamp handle pivot pin 29e to a position against the first component tube 22 to retract the clamp plate 29a and clamp the first component 20 to the drop ceiling 11. Alternately, the clamp handle 29c may be rotated outwardly from the first component tube 22 to extend the clamp plate 29a and release a grip of the first component 20 upon the drop ceiling 11 as seen in FIG. 4b.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be installed as indicated in FIG. 1.

The method of utilizing the system 10 may be achieved by performing the following steps: procuring the system 10; attaching the first component 20 to the drop ceiling 11 by rotating the clamp handles 29c outwardly to open the clamp plate portions 29a of the first component clamps 28; hooking the clamp plates 29a onto an edge portion of a "T"-rail portion or other feature of the drop ceiling 11; rotating the clamp handles 29c inwardly to clamp the clamp plates 29a against the drop ceiling 11; attaching the second component 30 at an opposing edge portion of the drop ceiling 11 in like manner via the second component clamps 36; routing the cable 12 between the gate portions 24a, 24b upon the first component tube 22 and through the guidepost portions 34 of the second component 30; repeating the above steps as needed to route and install cables 12; and, utilizing the system 10 as desired to install cables 12 in a drop ceiling.

Following installation of one (1) or more cables 12, the first 20 and second 30 component portions of the system 10 may be removed from the drop ceiling 11 by lifting said cables 12 from between the gate assemblies 24a, 24b and guidepost portions 34; rotating the clamp handles 29c outwardly to open the clamp plate portions 29a; and, lifting and removing the first 20 and second 30 components from the drop ceiling 11.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An electrical fishing system, comprising:
   a first component comprising:
      a generally tubular first body;
      a first gate portion and an opposing second gate portion, each affixed to an upper surface of said first body; and,
      a pair of first clamps; and,
   a second component comprising a generally tubular second body, a guidepost structure, and a plurality of second clamps;
   wherein said first component is configured to be installed on a first edge adjacent an entrance of a drop ceiling;
   wherein said second component is configured to be installed on a second edge, opposite said first edge of said drop ceiling;
   wherein said first component and said second component are each configured to enable a cable to be routed therethrough; and,
   wherein said first gate portion and said second gate portion are mirror-image spring-loaded cam devices which enable a cable to advance when said cable is motioned forwardly and to clamp on said cable and cease motion when said cable is motioned rearwardly.

2. The system of claim 1, wherein said first gate portion and said second gate portion each comprises:
   an arcuate member affixed to said first body via a pivot bolt;
   a torsion spring encompassing an outer surface of said pivot bolt; and,
   an outwardly facing textured surface of said arcuate member configured to provide a frictional contact with said cable;
   wherein said torsion spring of each said first gate portion and said second gate portion biases said first gate portion against said second gate portion.

3. The system of claim 1, wherein said pair of first clamps is located at opposing ends along a lower surface portion of said first body.

4. The system of claim 3, wherein said pair of first clamps each comprise:
   a clamp shaft routed through a latitudinal center line and spanning a diameter of said first body;
   a clamp plate perpendicularly affixed to a first end of said clamp shaft and extending downwardly therefrom;
   a clamp spring encompassing an outer surface of said clamp shaft, disposed between said clamp plate and said first body, biasing said clamp plate away from said first body; and,
   a clamp handle pivotally affixed to a second end of said clamp shaft.

5. The system of claim 1, wherein said guidepost structure further comprises a pair of guidepost portions integral to and upwardly extending from said second body.

6. The system of claim 5, wherein said pair of guidepost portions comprise parallel cylindrical appendages intermediately positioned upon said second body and spaced apart so as to slidingly contain at least one cable therebetween.

7. The system of claim 1, wherein said pair of second clamps is located at opposing ends along a lower surface portion of said second body.

8. The system of claim 7, wherein said pair of first clamps each comprise:
   a clamp shaft routed through a latitudinal center line and spanning a diameter of said first body;
   a clamp plate perpendicularly affixed to a first end of said clamp shaft and extending downwardly therefrom;
   a clamp spring encompassing an outer surface of said clamp shaft, disposed between said clamp plate and said first body, biasing said clamp plate away from said first body; and,
   a clamp handle pivotally affixed to a second end of said clamp shaft.

* * * * *